United States Patent
Bel

(10) Patent No.: US 8,061,433 B1
(45) Date of Patent: Nov. 22, 2011

(54) MANUALLY OPERATED ADJUSTABLE EARTH MOVING TOOL

(75) Inventor: Ronald Bel Bel, Washingtonville, NY (US)

(73) Assignee: Ron's Worksavers, LLC, Washingtonville, NY (US)

( * ) Notice: Subject to any disclaimer, the term of this patent is extended or adjusted under 35 U.S.C. 154(b) by 45 days.

(21) Appl. No.: 12/846,398

(22) Filed: Jul. 29, 2010

(51) Int. Cl.
*A01B 1/00* (2006.01)

(52) U.S. Cl. .......................................... 172/372

(58) Field of Classification Search .................. 172/371, 172/372
See application file for complete search history.

(56) References Cited

U.S. PATENT DOCUMENTS

| | | | | |
|---|---|---|---|---|
| 1,901,778 | A | * | 3/1933 | Schlag ............................ 172/372 |
| 3,226,149 | A | * | 12/1965 | McJohnson ...................... 294/50 |
| 3,335,735 | A | * | 8/1967 | Colegrove et al. ............... 135/69 |
| 5,209,534 | A | | 5/1993 | Crenshaw et al. |
| 5,435,396 | A | * | 7/1995 | Robichaux ...................... 172/378 |
| 5,706,900 | A | | 1/1998 | Liao |
| 5,743,579 | A | | 4/1998 | Ranburger |
| 6,564,880 | B2 | | 5/2003 | Williams et al. |
| D495,567 | S | | 9/2004 | Gontar |
| 6,843,324 | B2 | * | 1/2005 | Basek ........................... 172/378 |
| 7,121,599 | B2 | * | 10/2006 | Demar et al. .................... 294/60 |
| 7,314,096 | B2 | * | 1/2008 | Shaffer et al. .................. 172/372 |
| 2007/0125559 | A1 | | 6/2007 | Hus |

OTHER PUBLICATIONS

Gibson Group, Post Hole Borer, http://shop.visatools.co.uk/index.asp?function=displaycat&catid=30.

* cited by examiner

*Primary Examiner* — Thomas Will
*Assistant Examiner* — Joel F. Mitchell
(74) *Attorney, Agent, or Firm* — Tracy Jong Law Firm; Cheng Ning Jong; Louis Reale

(57) ABSTRACT

A manually operated device or tool for manipulating or working the earth or soil. A preferred embodiment possesses an elongated digging rod having an adjustable handle assembly configured to quickly locate and fasten to a plurality of predetermined set points located on the elongated digging rod. The apparatus compensates for the incremental deepening of a hole as the digging activity progresses so to enable a user to better maintain a preferred, upright, working posture. This is accomplished by adjusting the elongated digging rod, given a substantially constant handle assembly height, to consecutively lower settings corresponding to the increasing hole depth.

9 Claims, 9 Drawing Sheets

MANUALLY OPERATED ADJUSTABLE EARTH MOVING TOOL

This utility patent application is being filed in the name of Ronald Bel, residing in Washingtonville, N.Y.

FIELD OF THE INVENTION

This invention generally relates to manually operated devices or tools for manipulating or working the earth or soil. In a more specific aspect, this invention relates to a manually operated earth affecting tool having a vertically adjustable handle portion to compensate for the incremental deepening of a hole as the digging activity progresses.

BACKGROUND OF THE INVENTION

The present invention is directed to an earth moving tool, wherein the tool assists the user in the creation of a hole, pit, or the like. The type holes under discussion are primarily characterized by those that can be reasonably created using manual tools. Tasks where earth manipulation is required are many, examples include the installation of posts for fences, mailboxes, and the like; as well as general landscaping and gardening tasks.

One common type of digging implement or tool is characterized by an elongated bar type structure typically used in a vertical orientation. Such tools are commonly used to break-up and dislodge rocks in addition to loosening hard soil. Such tools are commonly constructed from dense metallic materials such as iron and iron based alloys. These tools typically possess an earth working end and a top end where a user controls the tool's movement. A variation of such a digging tool further includes a fixed elongated handle member perpendicularly mounted onto the top portion or user end of the elongated member. Such a handle provides a user with a lever arm type mechanical advantage (torque) when manipulating the tool. Unfortunately, such fixed handle digging implements have an inherent flaw that leads the user to eventually deviate from the user's preferred natural work posture. Typically, such a work posture is the most comfortable position for the user given the task at hand. Typically, the user enjoys a relatively short time in the preferred working stance (e.g. user is standing upright, forearms perpendicular to the body with hands reaching forward resting on each end of the fixed elongated handle) before the hole is worked to a depth where the user must operate the tool in a humped-over, kneeling, or like awkward working position. Such awkward working positions are known to prematurely tire users due to their inefficient, uncomfortable nature. Additionally, ergonomic concerns can arise when users are compelled to assume questionable postures when operating like tools or machinery.

Description/discussion of the related art possessing such fixed handle digging implements incorporating the aforementioned inadequacies includes; U.S. Pat. No. 5,209,534 to Crenshaw, U.S. Pat. No. 5,706,900 to Liao, U.S. Pat. No. 6,564,880 to Williams, and U.S. Pat. Pub. 2007/0125559 to Taichung. These related art references describe devices that possess a fixed handle member incapable of any ergonomic adjustments. Therefore, such instruments possess a narrow working range, limited to a specific hole depth (or narrow range of hole depths), where the user is able to work the tool in their comfort zone. As the hole depth deviates from the given tool's optimum depth range, the user will succumb to a variety of questionable working stances where each stance is primarily a function of hole depth.

Consequently, there remains a need for a digging tool that includes an elongated handle member that not only provides a user with a lever arm type mechanical advantage when manipulating the tool, but enables a user to create a hole from start to finish while substantially working in a user's preferred working position or comfort zone throughout the entire digging process.

SUMMARY OF THE INVENTION

The manually operated adjustable earth moving tool is comprised of an elongated substantially solid bar for working the earth, configured to receive a handle assembly that is adjustable about the length of the elongated substantially solid bar creating an adjustable sliding engagement between the two members. The engagement between the two members further includes a means for temporarily locking the handle assembly onto any predetermined point on the solid bar, thereby preventing any substantial movement of the handle assembly relative to the solid bar. The present invention overcomes the weakness of prior digging tools by providing the user with a means for maintaining a substantially constant work posture regardless of hole depth.

Accordingly, it is an object of the present invention to provide an improved manually operated soil affecting tool to assist in the creation of holes and the like.

It is another object of the present invention to provide a device that saves a user time and effort in the creation of holes and the like.

It is yet another object of the present invention to provide a device that minimizes the awkward body positions and related stress/strain associated with digging holes and the like.

It is yet another object of the present invention to provide a manually operated soil affecting tool that is durable and reliable.

It is yet another object of the present invention to provide a device that is portable.

It is yet another object of the present invention to provide a device that can be worked by a single user from a comfortable standing position, without requiring the user to substantially deviate from the initial comfortable position taken as hole creation progresses and hole deepens.

It is yet another object of the present invention to provide a device that is constructed from materials that are resistant to damage when engaging hard soil, clay, rocks, ice, asphalt, and the like.

It is yet another object of this invention to provide a relatively simple device that is economical from the viewpoint of the manufacturer and consumer, is susceptible of low manufacturing costs with regard to labor and materials, and which accordingly is then susceptible of low prices for the consuming public, thereby making it economically available to the buying public.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

PARTICULAR ADVANTAGES OF THE INVENTION

The present invention provides the user having the task directed to the manipulation of earth or soil with several advantages. The present invention is a portable, manually operated device that is both durable and reliable which is configured to save a user time and effort.

The handle assembly is slidably attached to the elongated substantially solid bar, and provides the user with a lever arm type mechanical advantage (torque) in addition to an adjusting feature that allows said handle assembly to compensate for the incremental deepening of a hole as the digging activity progresses.

Additionally, the handle assembly can be vertically adjusted during the hole digging or like process while the configured tip attached to the elongated substantially solid bar maintains its proper orientation within the work cavity. The device can be worked by a single user from a comfortable standing position, without requiring the user to substantially deviate from the user's preferred working position as hole creation progresses and hole deepens.

BRIEF DESCRIPTION OF THE DRAWINGS

The invention will be described by reference to the specification and the drawings, in which like numerals refer to like elements, and wherein.

Figure 1:
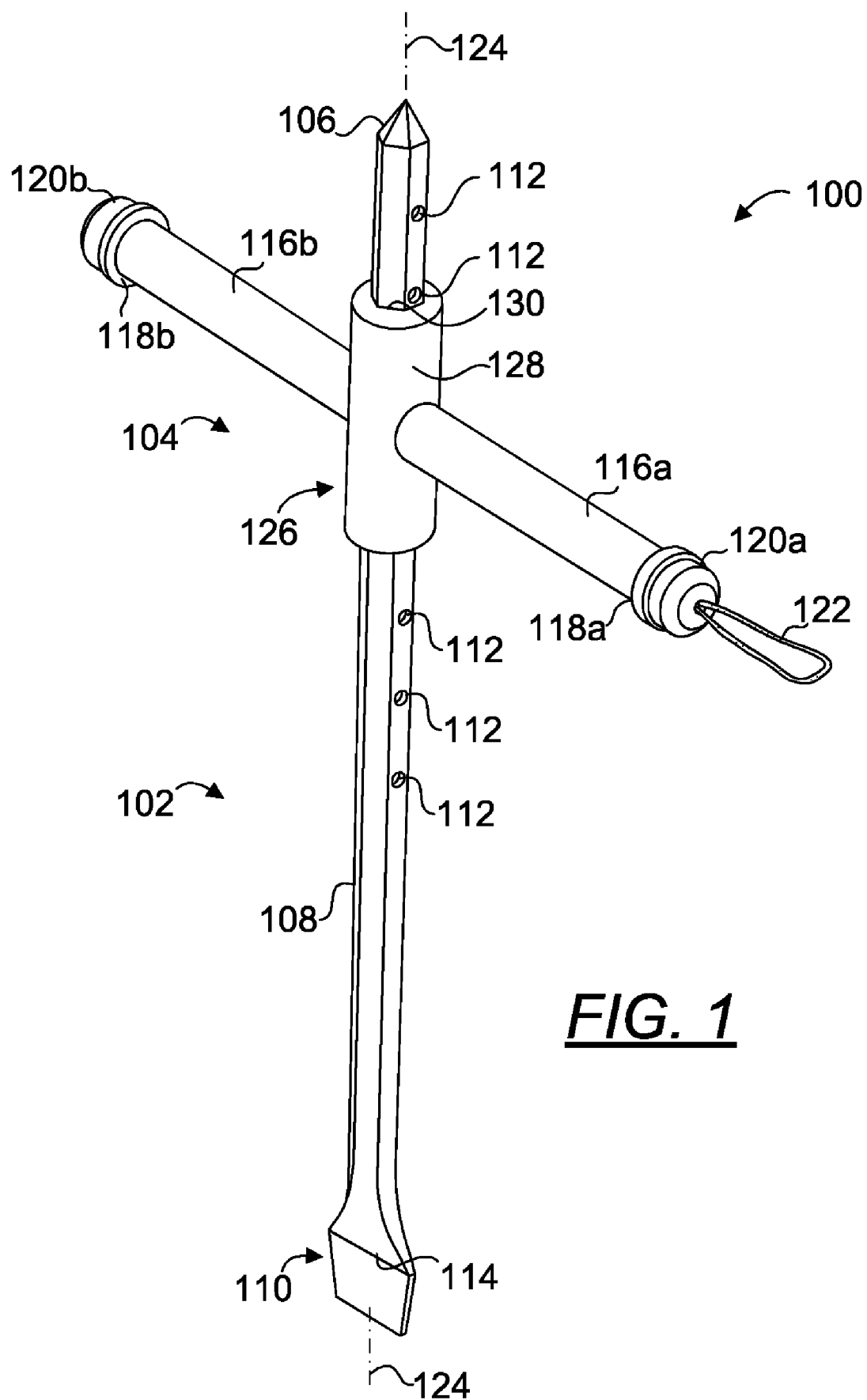
FIG. 1 illustrates a perspective front-top view of one embodiment of the manually operated adjustable earth moving tool having elongated solid bar integrated configured tips.

The drawings are not to scale, in fact, some aspects have been emphasized for a better illustration and understanding of the written description.

DEFINITIONS OF TERMS USED IN THIS SPECIFICATION

The manually operated adjustable earth moving tool discussed throughout this disclosure shall have equivalent nomenclature, including: earth moving tool, earth or soil affecting tool, the tool, the device, the apparatus, the present invention, or the invention. Additionally, the term "exemplary" shall possess a single meaning; wherein the sole definition pertains to serving as an example, instance, or illustration.

In order to help facilitate the understanding of this disclosure, a parts/features list numbering convention has been employed. The first digit in three digit part numbers refers to the Figure number where the part was first introduced, or is best depicted. Likewise, in four digit part numbers, the first two digits refer to the Figure number where the part was first introduced, or is best depicted. Although this disclosure may at times deviate from this convention, it is the intention of this numbering convention to assist in an expeditious comprehension of this application.

PARTS/FEATURES LIST 100. manually operated adjustable earth moving tool
102. elongated solid bar
104. handle assembly
106. top end
108. intervening portion 110. lower end
112. plurality of bolt-holes
114. configured tip (chisel geometry)
116a. first handle
116b. second handle
118a. outer end (first handle)
118b. outer end (second handle)
120a. end cap (first handle)
120b. end cap (second handle)
122. user disengagement member (first handle)
124. central longitudinal axis
126. tubular receiver
128. outer portion (tubular receiver)
130. inner portion (tubular receiver)
202. tubular spacer
204. inner washer
206. outer washer
208. compression spring
210a. user end (user disengagement member)
210b. inner end (user disengagement member)
212. fastening pin
214. bar locking pin (locking pin)
214a. first end (locking pin)
214b. second end (locking pin)
216a. first bushing
216b. aperture (first bushing)
218a. second bushing
218b. aperture (second bushing)
220a. first set of threads
220b. second set of threads
222a. inner end (first handle)
222b. inner end (second handle)
224a. inner diameter (first handle)
224b. outer diameter (first handle)
302a. inner end (compression spring)
302b. outer end (compression spring)
304. relaxed or home position length (compression spring—locking pin engaged)
306. engagement width (bar)
308. handle length
310. tubular receiver height
312. overall width (handle assembly)
314. locked position (user disengagement member)
408. compressed or unlocked length (compression spring—locking pin disengaged)
412. bolt-hole (cut-away, top-view)
414. disengaged position (user disengagement member)
500. tool (second embodiment—handle assembly locked onto elongated bar 506)
502. inner diameter (handle 526a and 526b)
504. diameter (bolt-hole)
506. elongated bar
508. compression spring
510a. user end, ring, or first end (user disengagement member)
510b. locking pin end or second end (user disengagement member)
512a. bolt-hole (unused)
512b. bolt-hole (active)
512c. bolt-hole (unused)
514. locked or home position (user disengagement member)
516. locking pin
518a. first end (locking pin)
518b. second end (locking pin)
520. end cap
522. user disengagement member (rigid rod)
524. end cap aperture
526a. first handle
526b. second handle
528a. first end (locking pin)
528b. second end (locking pin)
600. tool (second embodiment)
614. unlocked or disengaged position (user disengagement member)
700. alternate handle assembly (utilizing a nut and bolt fastening means)
702. bolt
704. nut
802. tubular receiver
900. alternate handle assembly (utilizing a hairpin type cotter pin)
902. hairpin type cotter pin
1002. tubular receiver
1004. tubular receiver apertures
1100. elongated solid bar (with configured tip attaching means)
1110. lower end
1112. plurality of bolt-holes
1114. tip attaching aperture(s) (interchangeable)
1116. elongated solid bar cross sectional geometry
1200. hexagonal sectional geometry
1300. circular sectional geometry
1400. oval sectional geometry
1500. screw type (auger) interchangeable configured tip
1502. attaching apertures
1504. tubular receiving end
1600. chisel (flat blade) interchangeable configured tip
1602. attaching apertures
1604. tubular receiving end
1606. bolt
1608. nut

DETAILED DESCRIPTION

With reference to the drawings of the present invention, several embodiments of the manually operated adjustable earth moving tool and subsystem or component variations thereof will be described. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

In this context, the manually operated adjustable earth moving tool and components comprising the assembly thereof may be constructed from any durable, impact resistant type materials such as various metals, metal alloys, composite materials, tough polymeric materials, or any combination thereof. In preferred embodiments the device would be constructed from corrosion resistant, wear-resistant, materials or material combinations such as drop forged steel having a rust inhibiting finish, stainless steel, and the like. Other adjustable earth moving tool subsystem material considerations will be addressed during the forthcoming specific subsystem component discussions.

FIG. 1 illustrates a perspective front-top view of one embodiment of the manually operated adjustable earth moving tool 100 having an elongated solid bar 102 with an integrated configured tip 114 located on lower end 110. Elongated solid bar 102 is designed to slidingly engage with handle assembly 104 to provide a plurality of distinct stops along the length of elongated solid bar 102 that is user adjustable via manipulation of user disengagement member 122.

Figure 12:
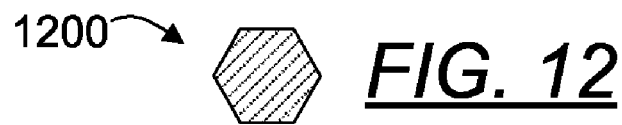
FIG. 12 illustrates a cross sectional view of an elongated solid bar exemplary configuration having a hexagonal cross sectional geometry.

Elongated solid bar 102 is a substantially solid component having an intervening portion 108 located between top end 106 and lower end 110. Intervening portion 108 is populated with a plurality of bolt-holes 112 having substantially identical dimensions and orientations with respect to central longitudinal axis 124 resulting in a linear array of height adjustment bolt-holes. In preferred embodiments, a plurality of bolt-holes 112 are equidistant from one another and fabricated perpendicular to central longitudinal axis 124. Additionally, in preferred embodiments, the plurality of bolt-holes 112 are uniformly configured such that they are bisected by central longitudinal axis 124 so to promote device symmetry. Device symmetry will help ensure non-polarized device features such that device assembly is not limited to just one configuration. Elongated solid bar 102 possesses a hexagonal sectional geometry 1200 (as depicted in FIG. 12) about a substantial portion of its length. The hexagonal sectional geometry 1200 is depicted along the entire length of elongated solid bar 102 in this particular embodiment for exemplary purposes only.

Exemplary handle assembly 104 is constructed from several components. Components include a tubular receiver 126 having an outer portion 128, and an inner portion 130 configured to receive the sectional geometry of elongated solid bar 102 so to provide sliding engagement cooperation. Symmetrically disposed about outer portion 128 of tubular receiver 126 are two opposing handles, i.e. first handle 116a and second handle 116b.

First handle 116a has an attached end cap 120a at outer end 118a; likewise, second handle 116b has an attached end cap 120b at outer end 118b. Protruding out of end cap 120a is user disengagement member 122. Disengagement member 122 provides a user with the means for adjusting handle assembly 104 along elongated solid bar 102, wherein handle assembly 104 is slidably affixed to any one of the plurality of bolt-holes 112 disposed along the length of intervening portion 108 portion of elongated solid bar 102. One of the primary advantages of the present invention is that it compensates for the incremental deepening of a hole as the digging activity progresses so to enable a user to better maintain a preferred, upright, working posture. This is accomplished by adjusting the elongated digging rod, given a substantially constant handle assembly height, to consecutively lower settings corresponding to the increasing hole depth.

Figure 2:
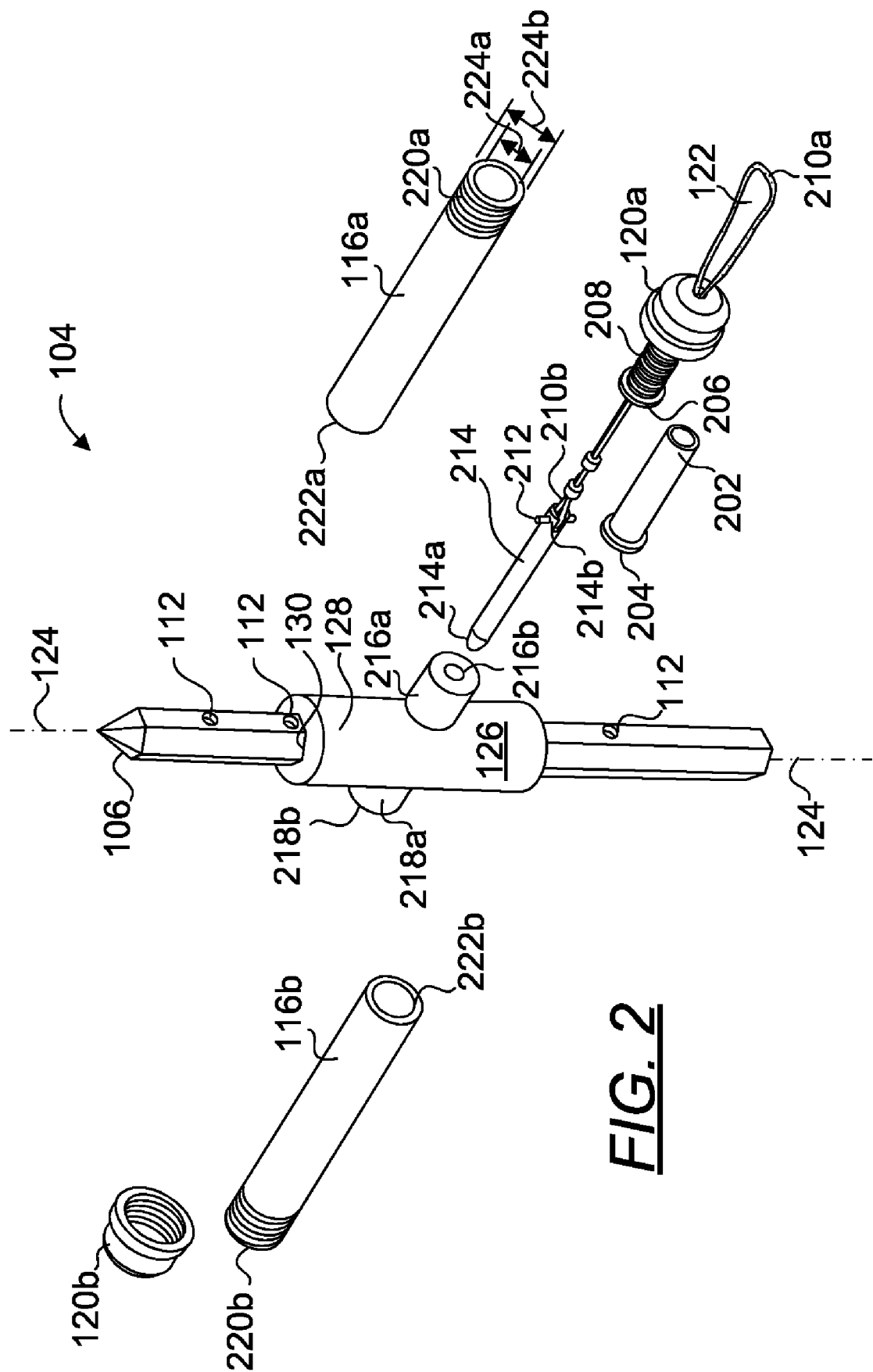
FIG. 2 illustrates an exploded front-top perspective view of one type of handle assembly mounted on an elongated solid bar.

FIG. 2 illustrates an exploded front-top perspective view of exemplary handle assembly 104 mounted on the upper portion of elongated solid bar 102. Presented, by way of example, but not limitation is an assembly that provides a means for adjusting handle assembly 104 along elongated solid bar 102 via the use of an integrated self-actuating locking pin assembly. The self-actuating locking pin assembly is configured to be contained within either first handle 116a or second handle 116b; in the present depiction, the assembly is shown to be contained within first handle 116a. The following is primarily an introduction to the elements comprising the self-actuating locking pin assembly and their basic functions. Forthcoming figures will further address the cooperation among the various self-actuating locking pin assembly elements.

First handle 116a possesses an inner diameter 224a and an outer diameter 224b, an inner end 222a directed to tubular receiver 126 and an opposing end having a first set of threads 220a for engaging end cap 120a. Likewise, second handle 116b possesses similar attributes including an inner end 222b directed to tubular receiver 126 and an opposing end having a second set of threads 220b for engaging end cap 120b.

A locking pin or more specifically a bar locking pin 214 is used to mate with any one of the plurality of bolt-holes 112 disposed along the length of elongated solid bar 102. Bar locking pin 214 is ideally fabricated from a wear resistant material such as hardened steel or the like. Bar locking pin 214 possesses a first end 214a and second end 214b. A preferred version of first end 214a comprises a tapered or bullet head type of configuration to help ensure lead-in engagement of bar locking pin 214 into any one of the plurality of bolt-holes 112. Optionally, having a plurality of bolt-holes 112 each possessing a countersink feature would help ensure reliable plunging action as well as removing any bolt-holes 112 sharp edges. Second end 214b is configured to accept a fastening pin 212 or the like, that functions to fasten bar locking pin 214 to inner end 210b of user disengagement member 122. Optionally, fastening pin 212 can provide a fastening pin 212 travel limiter or hard stop feature, accomplished by having a fastening pin 212 length larger than the diameter of aperture 216b of first bushing 216a. Aperture 218b of first bushing 218a provides a seat for first end 214a of bar locking pin 214 when the device is in the locked state as best depicted in FIG. 3.

Tubular spacer 202 cooperates with outer washer 206 and inner washer 204 acting as a buffer that functions to transfer the force provided by compression spring 208 to bar locking pin 214 via fastening pin 212. User end 210a of user disengagement member 122 is non-elastically coupled to fastening pin 212 about the inside of tubular spacer 202 via user disengagement member 122 connection.

Figure 3:
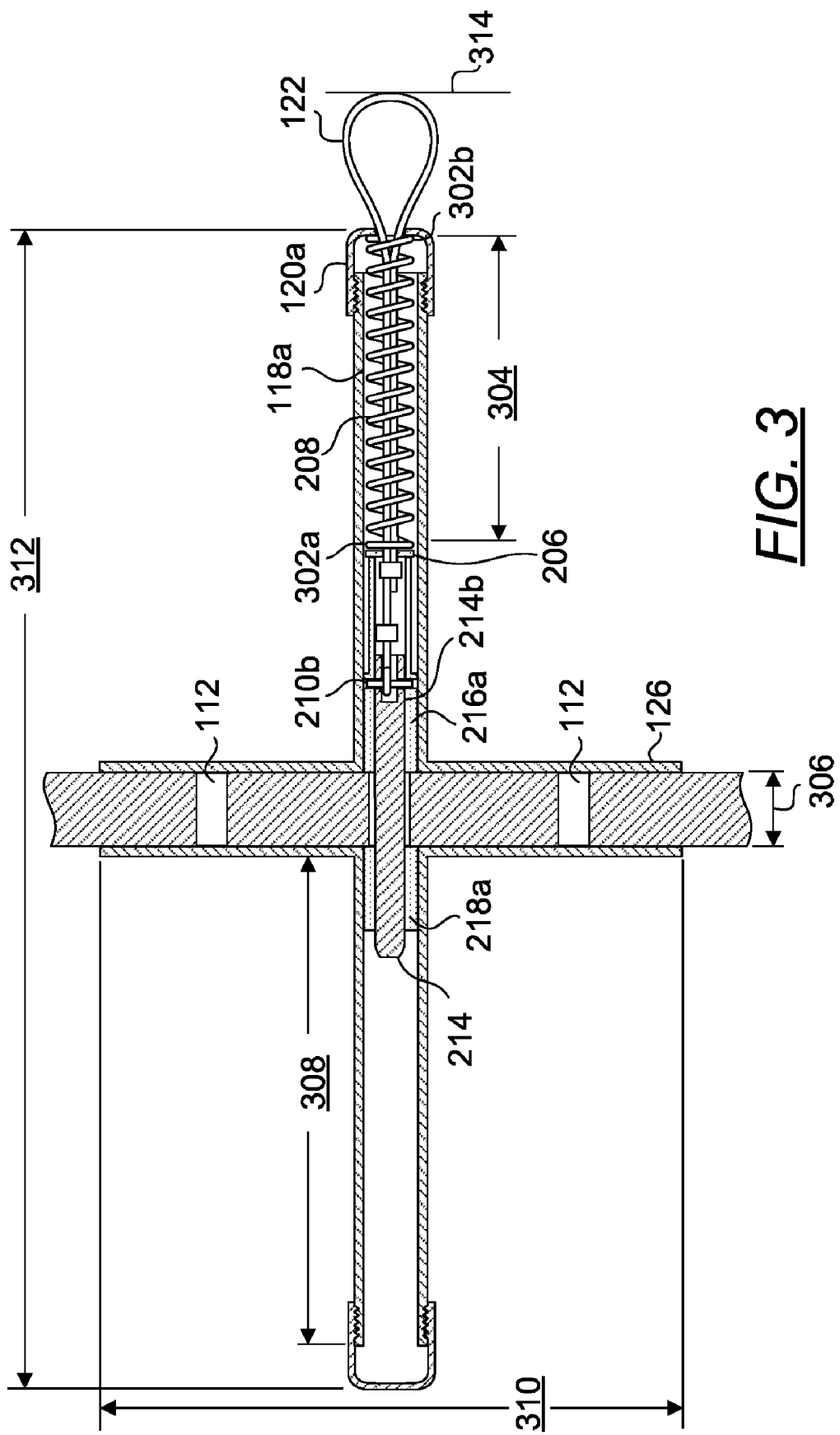
FIG. 3 illustrates a front sectional view of the handle assembly of FIG. 2, mounted on an elongated solid bar; wherein the handle assembly is in the locked state.

FIG. 3 illustrates a front sectional view of the handle assembly of FIG. 2, mounted on an elongated solid bar; wherein the handle assembly is in the locked state. The locked state is the steady state or the resting condition of the device without user intervention. The locked state or condition shown is characterized by having bar locking pin 214 engaging any one of a plurality of bolt-holes 112. In the locked state, compression spring 208 is in the relaxed or home position length 304 having a corresponding user disengagement member 122 in locked position 314. Compression spring 208 inner end 302a is urging against distal end of end cap 120a while outer end 302a simultaneously urges against outer washer 206.

The following discussion is directed to various aspects of elongated solid bar 102 where exemplary dimensions are discussed. Engagement width 306 of elongated solid bar 102 ranges from 0.5 inches to 2.0 inches; and is selected for dimensional cooperation with tubular receiver 126 as well as overall device strength and weight considerations.

The following discussion reviews exemplary dimensions directed to various aspects of handle assembly 104. Exemplary dimensions include: tubular receiver height 310 ranges from 4.0 inches to 15.0 inches, overall width 312 ranges from 8.0 inches to 30.0 inches, and handle length 308 ranges from 4.0 inches to 15.0 inches.

Figure 4:
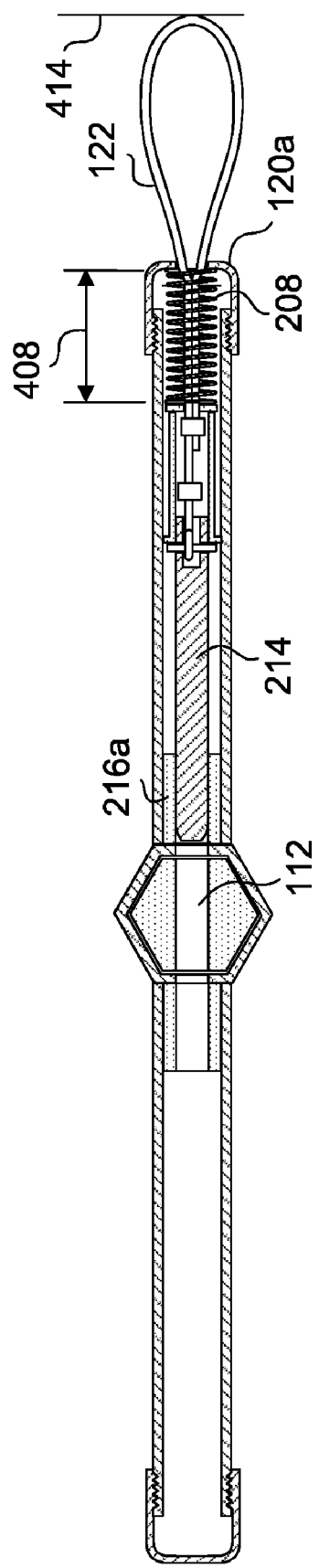
FIG. 4 illustrates a top sectional view of the handle assembly of FIG. 3, mounted on the top portion of an elongated solid bar; wherein the handle assembly is in the unlocked state.

FIG. 4 illustrates a top sectional view of the handle assembly of FIG. 3, mounted on an elongated solid bar; wherein the handle assembly is in the unlocked state. The unlocked state is the condition where the user of the device is able to adjust the handle assembly 104 about the length of elongated solid bar 102 by adjusting to and engaging with any one of plurality of bolt-holes 112. The unlocked state shown is characterized by having bar locking pin 214 in the disengaged configuration, free from engagement with any bolt-holes 112. In the unlocked state, compression spring 208 is in the compressed or unlocked length 408 with corresponding user disengagement member 122 in unlocked position 414.

Figure 5:
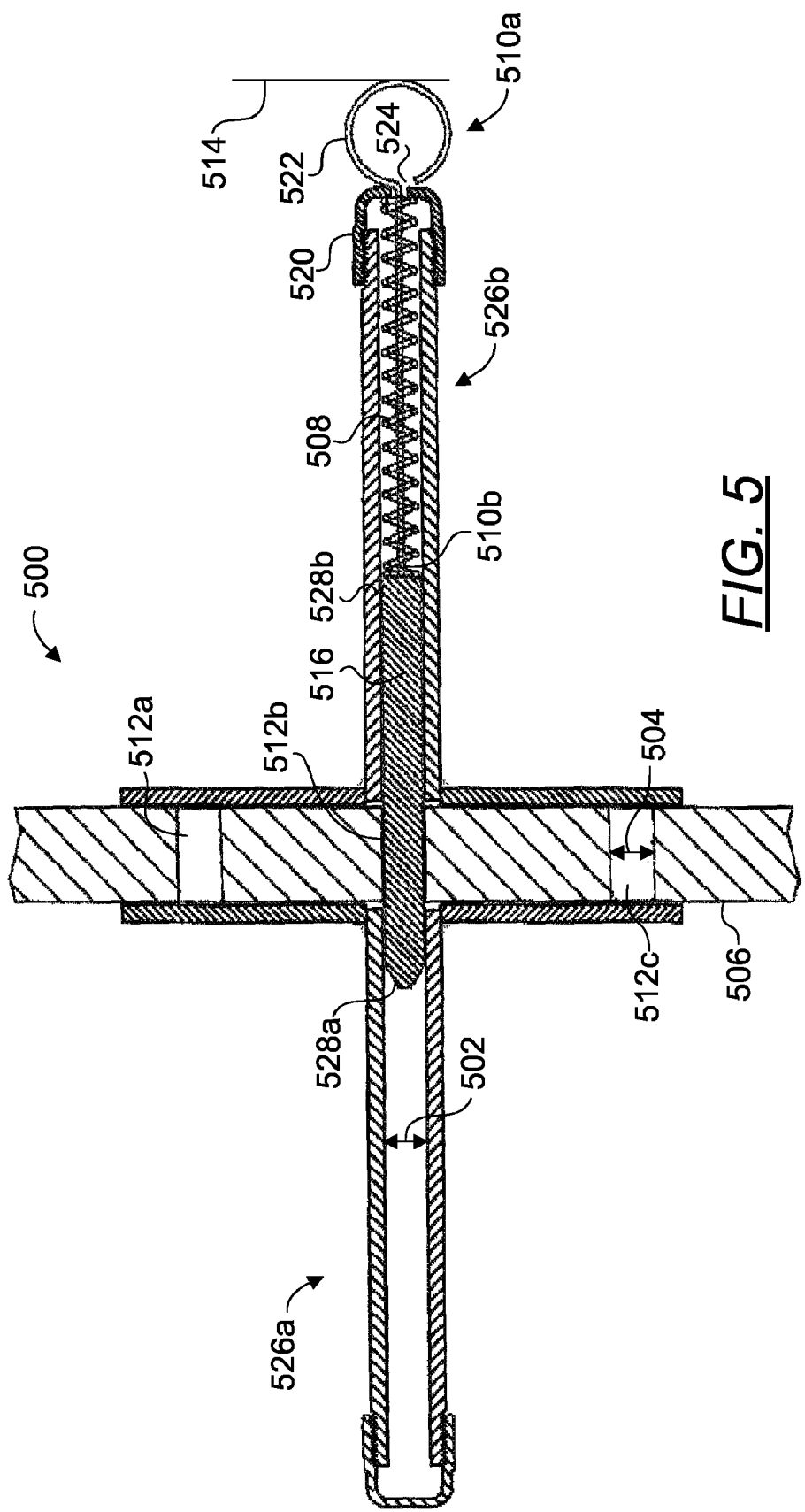
FIG. 5 illustrates a front sectional view of a second embodiment tool with a handle assembly mounted on an elongated solid bar; wherein the handle assembly is in the locked state.

FIG. 5 illustrates a front sectional view of a manually operated adjustable earth moving tool second embodiment depicting a handle assembly mounted on an elongated solid bar 506; wherein the handle assembly is in the locked state. The tool (second embodiment) 500 is configured such that handle inner diameter 502, bolt-hole diameter 504, diameter of compression spring 508, and locking pin 516 diameter are of substantially similar dimensions such that a close fitting, reliable plunging relationship between locking pin 516, bolt-holes 512(*a,b,c*) and first and second handle 526*a*, 526*b* is enabled. Because of the substantially similar dimensions of the aforementioned components, tool 500 is a simpler design that functions with fewer components. Component dimensions enabling such a configuration can be achieved by careful component selection, the use of sleeves or spacers, custom machining, or any combination thereof.

User disengagement member 522 can take on a variety of design configurations and be constructed from a wide variety of materials. Member 522 depicted in FIG. 5 is formed from a rigid rod type of material for exemplary purposes. Other types of rigid material can be used such as bar stock, piping, and the like. Yet other configurations include: the use of flexible materials such as wire, rope, or cable, terminated by a knot, handle, or the like. The use of flexible materials for member 522 yields advantages, for example, user end 510*a* element will be less susceptible to damage when the unit is dropped, stored.

In this embodiment, locking pin 516 travel is limited by the length of the user disengagement member 522 having an end stopping means. The end stopping means of FIG. 5 depicts a ring or an enlarged user end 510*a* that rests outside of end cap 520 when the unit is in the locked condition. The exemplary stop is achieved by having a user end 510*a* that is larger than end cap aperture 524. Ring or an enlarged user end 510*a* is kept in home position 514, and is biased against end cap aperture 524 by an inward force generated by compression spring 508. FIG. 5 depicts compression spring 508 in a state of compression where immobile end cap 520 constrains one end of compression spring 508 while the remaining end of compression spring 508 engages second end 528*b* of locking pin 516, thereby urging first end 528*a* of locking pin 516 toward the direction of first handle 526*a*. Second end 510*b* of user disengagement member 522 is fastened to second end 528*b* of locking pin 516. The result is locking pin 516 being held in a predetermined position within bolt-hole 512*b* and inner portions of adjacent first and second handles 526*a*, 526*b*, thereby locking handle assembly onto elongated bar 506.

Figure 6:
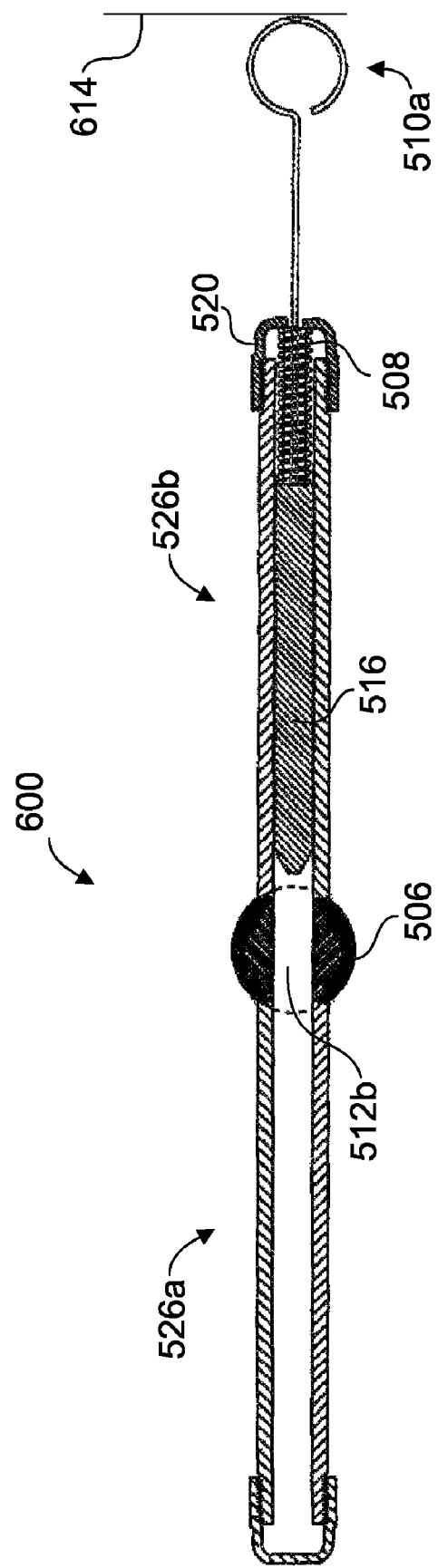
FIG. 6 illustrates a top sectional view of the second embodiment tool depicted in FIG. 5 detailing a handle assembly mounted on an elongated solid bar; wherein the handle assembly is in the unlocked state.

FIG. 6 illustrates a top sectional view of the second embodiment digging tool depicted in FIG. 5; wherein the handle assembly is in the unlocked state. Second embodiment tool 600 depicts ring or an enlarged user end 510*a* in unlocked or disengaged position 614; this is accomplished manually by a user. In the unlocked or disengaged position 614, compression spring 508 is in a compressed state wherein locking pin 516 is completely removed from bolt-hole 512*b* resulting in the uncoupling of the handle assembly from elongated bar 506.

Figure 7:
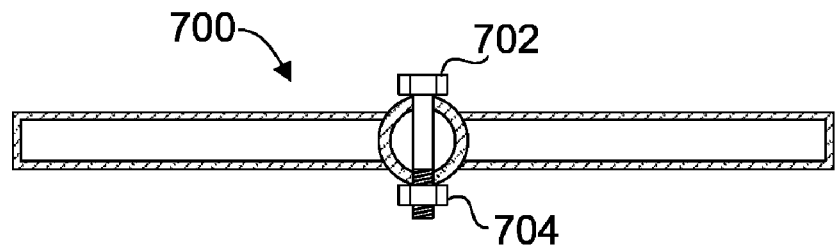
FIG. 7 illustrates a top sectional view of an alternate handle assembly embodiment having a nut and bolt fastening means adapted to secure the handle assembly to the elongated solid bar.

FIG. 7 illustrates a top sectional view of an alternate handle assembly embodiment having a nut and bolt fastening means adapted to secure a handle assembly to an elongated solid bar. Alternate handle assembly 700 utilizes a nut 704 and bolt 702 system to affix the handle assembly to an elongated solid bar. Such configurations can be used where handle assembly adjustments are infrequent and/or where a simpler, lower cost apparatus is preferred.

Figure 8:
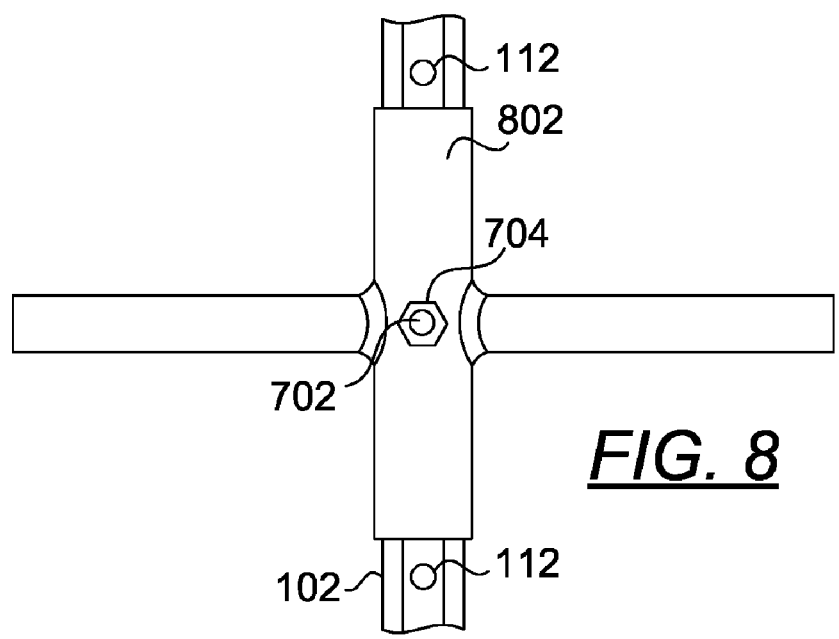
FIG. 8 illustrates a front view of the alternate handle assembly embodiment of FIG. 7 showing a nut and bolt fastening means securing the handle assembly to the elongated solid bar.

FIG. 8 illustrates a front view of the alternate handle assembly embodiment of FIG. 7 showing a nut and bolt fastening means of securing handle assembly 700 to elongated solid bar 102. The nut 704 and bolt 702 fastening system provides a user with a simple means for adjusting handle assembly 700 along elongated solid bar 102. Handle assembly 104 is slidably affixed to any one of the plurality of bolt-holes, by tubular receiver 802 portion of handle assembly 700, receiving the nut 704 and bolt 702 fastening system.

Figure 9:
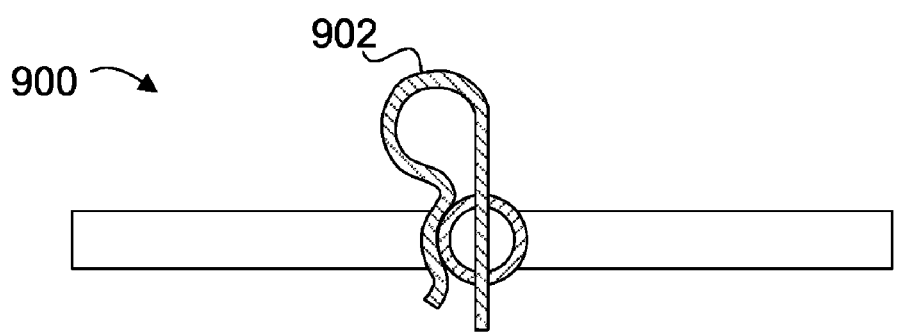
FIG. 9 illustrates a top sectional view of an alternate handle assembly embodiment utilizing a hairpin type cotter pin fastening means adapted to secure the handle assembly to the elongated solid bar.

FIG. 9 illustrates a top sectional view of an alternate handle assembly 900 embodiment utilizing a hairpin type cotter pin 902 fastening means adapted to secure the handle assembly to an elongated solid bar. Such configurations can be used where handle assembly adjustments are infrequent and/or where a simpler, lower cost apparatus is a preferred.

Figure 10:
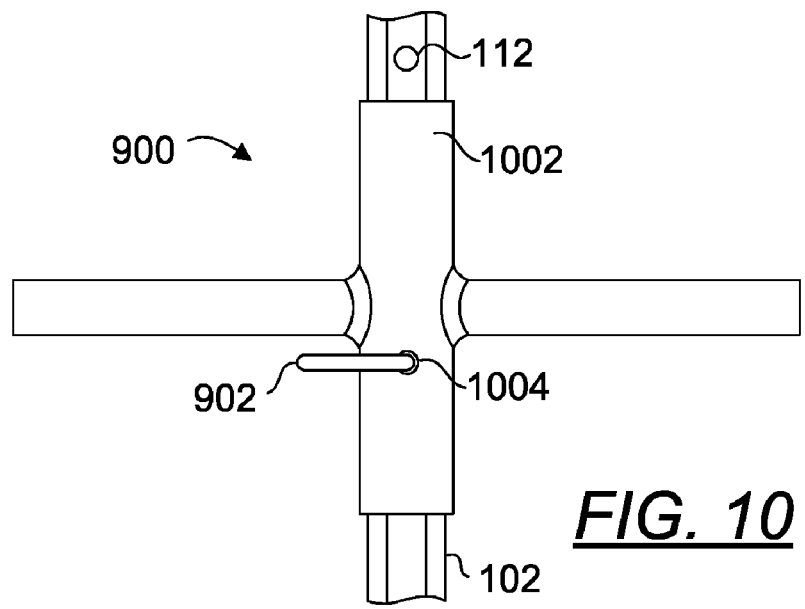
FIG. 10 illustrates a front view of the alternate handle assembly embodiment of FIG. 9 showing a hairpin type cotter pin fastening means securing the handle assembly to the elongated solid bar.

FIG. 10 illustrates a front view of the alternate handle assembly 900 of FIG. 9 mounted onto elongated solid bar 102. The cotter pin fastening system provides a user with a simple means for adjusting handle assembly 900 along elongated solid bar 102, wherein handle assembly 900 is slidably affixed to any one of the plurality of bolt-holes 112 disposed along the length of elongated solid bar 102. Alternate handle assembly 900 possesses tubular receiver 1002 having tubular receiver apertures 1004 configured to receive hairpin type cotter pin 902 or the like when said apertures 1004 align with any one of the plurality of bolt-holes 112.

Figure 11:
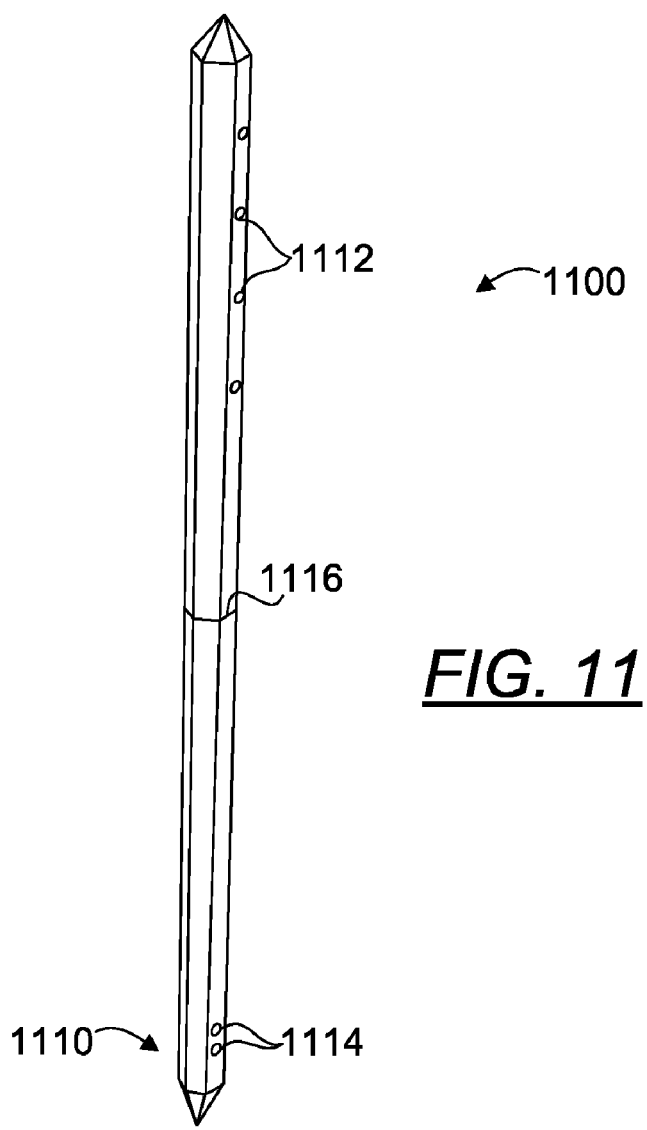
FIG. 11 illustrates a front-top perspective view of an alternate embodiment of an elongated solid bar having a means for attaching interchangeable configured tips.

FIG. 11 illustrates a front-top perspective view of an alternate embodiment of an elongated solid bar having a means for attaching interchangeable configured tips. Elongated solid bar 1100, like the aforementioned elongated solid bars, possesses a plurality of bolt-holes 1112 as well as an elongated solid bar cross sectional geometry 1116. The embodiment of FIG. 11 depicts elongated solid bar 1100 possesses at least one tip attaching aperture 114 disposed at lower end 1110 adapted to receive a configured tip.

Figure 13:
FIG. 13 illustrates a cross sectional view of an elongated solid bar exemplary configuration having a circular cross sectional geometry.
Figure 14:
FIG. 14 illustrates a cross sectional view of an elongated solid bar exemplary configuration having an oval cross sectional geometry.

An elongated solid bar cross sectional geometry 1116 in the present as well as aforementioned embodiments is an important feature consideration of the present invention. Elongated solid metal bars and cooperating handle assemblies possessing non-circular cross-sectional geometries are preferred over circular sectional geometry 1300 (as depicted in FIG. 13) due to the greater degree of mechanical coupling. More specifically, in non-circular cross-sectional geometries, elongated solid metal bars and cooperating handle assemblies are coupled to each other wherein rotational motion about the central longitudinal axis 124 with respect to one another is inhibited while permitting a sliding engagement between the elongated substantially solid metal bar and the handle assembly (best depicted in FIG. 1). Additionally, alignment between plurality of bolt-holes 1112 and handle assembly engaging member (e.g. cotter pin 902, bolt 702, locking pin 516) is assured. Both FIG. 12 and FIG. 14 illustrate exemplary non-circular cross-sectional geometries depicting hexagonal sectional geometry 1200 and oval sectional geometry 1400 respectively.

Figure 15:
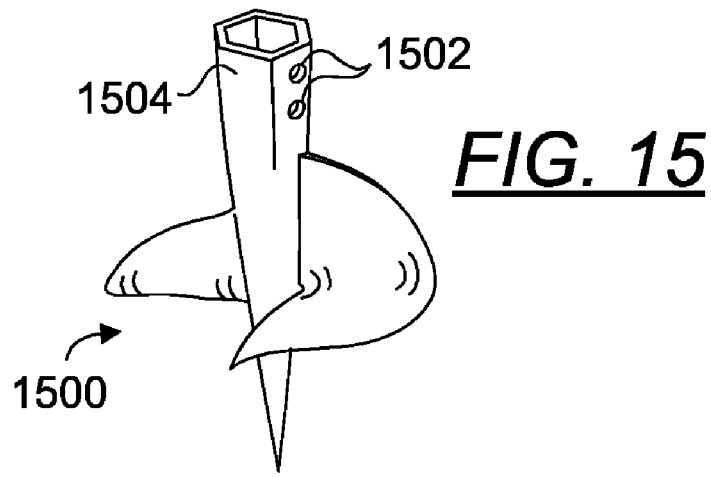
FIG. 15 illustrates a front-top perspective view of an interchangeable configured tip having a screw (auger) type configuration.

FIG. 15 illustrates a front-top perspective view of an interchangeable configured tip having a screw (auger) type configuration. Screw type (auger) interchangeable configured tip 1500 possesses attaching apertures 1502 disposed about the upper portion of tubular receiving end 1504. Attaching apertures 1502 disposed about the upper portion of tubular receiving end 1504 are configured to cooperate with lower end 1110 of elongated solid bar 1100 having tip attaching aperture(s) 1114 (depicted in FIG. 11). Exemplary means of fastening configured tip 1500 to lower end 1110 of elongated solid bar 1100 having tip attaching aperture(s) 1114 include, but not limited to: nut and bolt type systems, cotter pin type systems, quick-release type pins, axial screw on systems, and the like.

Figure 16:
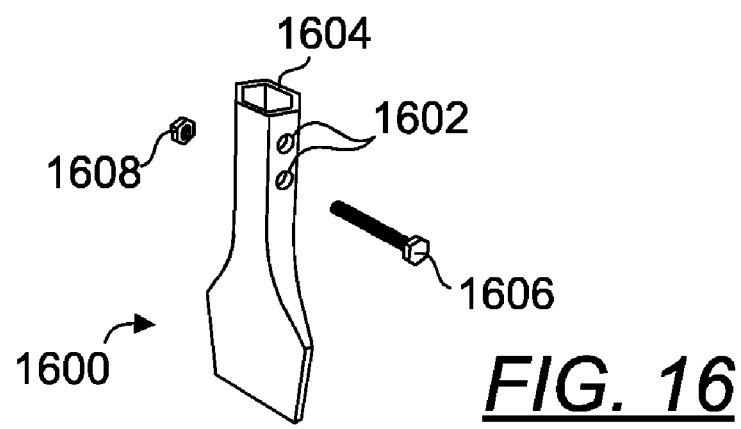
FIG. 16 illustrates a side-top perspective view of an interchangeable configured tip having a chisel (flat blade) type configuration.

FIG. 16 illustrates a side-top perspective view of an interchangeable configured tip having a chisel (flat blade) type configuration. Chisel (flat blade) interchangeable configured tip 1600 possesses attaching apertures 1602 disposed about the upper portion of tubular receiving end 1604. Attaching apertures 1602 disposed about the upper portion of tubular receiving end 1604 are configured to cooperate with lower end 1110 of elongated solid bar 1100 having tip attaching aperture(s) 1114 (depicted in FIG. 11). Exemplary means of fastening configured tip 1600 to lower end 1110 of elongated solid bar 1100 having tip attaching aperture(s) 1114 include, but not limited to: nut 1608 and bolt 1606 type systems, cotter pin type systems, quick-release type pins, axial screw on systems, and the like.

The configured tips shown in FIGS. 15 and 16 are exemplary tips that a user can interchange depending on the task to be performed and/or the properties of the soil to be worked. Additional configured tip configurations include chisel (flat blade) tips of various widths, screw type (auger) tips having a variety of properties (e.g. pitch, diameter), pointed tip configurations having various point geometries, and the like. Configured tips are preferably constructed out of tough durable materials (e.g. metals). In embodiments where removably attachable configured tips are used, the elongated substantially solid bar material selection possibilities are increased due to the configured tip bearing the majority of the associated wear due to impact with the soil. The elongated substantially solid bar is typically fabricated form metallic type materials such as iron, iron alloys, steel, stainless steel, and the like. Other acceptable materials include composites (e.g. fiberglass), and plastics—more specifically plastics that are rigid, resilient, tough, and strong (e.g. filler impregnated Phenolics, Cellulosics, and the like).

What is claimed herein is:

1. A manually operated adjustable earth moving tool, comprising:
    an elongated substantially solid bar having a central longitudinal axis, a first end, a second end, and an intervening portion located between said first end and said second end, said intervening portion having a length and a bar cross-sectional geometry,
    wherein said length of said intervening portion has a plurality of height adjustment bolt-holes linearly disposed along said length of said intervening portion of said elongated substantially solid bar wherein said plurality of bolt-holes have substantially identical dimensions and orientations with respect to said central longitudinal axis,
    at least one of said first end or said second end having a configured tip that provides a means for affecting soil,
    a handle assembly comprising a tubular receiver having an inner portion, an outer portion, and two coaxially aligned opposing handles, wherein said two coaxially aligned opposing handles each have an outer end and are both symmetrically disposed about said outer portion of said tubular receiver, and said inner portion has a receiver cross-sectional geometry substantially similar to said bar cross-sectional geometry such that a sliding engagement between said elongated substantially solid bar and said handle assembly is enabled,
    wherein a portion of said bar cross-sectional geometry and said receiver cross-sectional geometry having a substantially similar non-circular cross-sectional geometry such that said elongated substantially solid bar and said handle assembly are substantially coupled to each other wherein rotational motion about said central longitudinal axis with respect to one another is inhibited while permitting said sliding engagement between said elongated substantially solid bar and said handle assembly,
    a means for slidably affixing said handle assembly to any of said plurality of bolt-holes disposed along said length of said intervening portion, thereby providing a means for adjusting said handle assembly along said elongated substantially solid bar,
    wherein said means for slidably affixing said handle assembly further comprises one of said opposing handles of said handle assembly, having an outer end, further comprises an integrated self-actuating locking pin feature having a locked and an unlocked position, said integrated locking pin self-closing feature comprising:
        a handle end cap, removably attached to said outer end of at least one predetermined said opposing handles,
        a bar locking pin having a bar locking pin first end and a bar locking pin second end,
        a compression spring having a compression spring first end, a compression spring second end, a home position length, and a compressed length; and
        a user disengagement member having an inner end, a user end, a home position and a disengaged position, and
        said bar locking pin second end is connected to said user disengagement member said inner end, and said bar locking pin second end engages said first spring end of said compression spring, and said second end of said compression spring receives support from said handle end cap, thereby providing a means for generating a compression spring biasing force directed to said locking pin.

2. The manually operated adjustable earth moving tool of claim 1, wherein said intervening portion of said elongated substantially solid bar is fabricated from a material selected from the group consisting of metals, plastics and composites.

3. The manually operated adjustable earth moving tool of claim 1, wherein said plurality of bolt-holes have a constant predetermined distance between adjacent bolt-holes.

4. The manually operated adjustable earth moving tool of claim 2, wherein said configured tip is metallic and removably attachable.

5. The manually operated adjustable earth moving tool of claim 1, wherein said configured tip comprises a geometry selected from the group consisting of a point, a screw, and a chisel.

6. The manually operated adjustable earth moving tool of claim 1, wherein said handle is disassemblable from said elongated substantially solid bar, thereby providing a means for separating said handle assembly from said elongated substantially solid bar.

7. The manually operated adjustable earth moving tool of claim 1, wherein said integrated self-actuating locking pin feature further comprises a means for limiting travel of said locking pin such that consistent locking engagement with any of said plurality of bolt-holes disposed along said length of said elongated substantially solid bar is provided.

8. A handle assembly adapted to engage with an elongated substantially solid bar having a length, a cross-sectional geometry and a plurality of bolt-holes disposed along said length; said handle assembly, comprising:
    a tubular receiver having an inner portion, an outer portion, and two coaxially aligned opposing handles, wherein said two coaxially aligned opposing handles each have an outer end and are both symmetrically disposed about said tubular receiver said outer portion, and said inner portion has a receiver cross-sectional geometry substantially similar to said bar cross-sectional geometry such that a sliding engagement between said elongated substantially solid bar and said handle assembly is enabled, and a means for slidably affixing said handle assembly to said elongated substantially solid bar, such that said handle assembly cooperates with said plurality of bolt-holes disposed along said length of said elongated substantially solid bar, thereby providing a means for adjoining said handle assembly to any of corresponding said plurality of bolt-holes disposed along said length of said elongated substantially solid bar, wherein said means for slidably affixing said handle assembly further comprises one of said two opposing handles of said handle assembly having an integrated self-actuating locking pin assembly having a locked and an unlocked position, said integrated self-actuating locking pin assembly comprising:

a handle end cap, removably attached to said outer end of at least one predetermined handle of said two opposing handles, a locking pin having a locking pin first end and a locking pin second end, a compression spring having a compression spring first end, a compression spring second end, a home position length, and a compressed length; and a user disengagement member having an inner end, a user end, a home position and a disengaged position, wherein:

said locking pin second end is connected to said user disengagement member said inner end, said bar locking pin second end engages said first spring end portion of said compression spring, and said second end of said compression spring receives support from said handle end cap, thereby providing a means for generating a compression spring biasing force directed to said locking pin.

9. The handle assembly of claim 8, wherein said integrated self-actuating bar locking pin feature further comprises a means for limiting travel of said locking pin such that a stable locking engagement between said locking pin and any of said plurality of bolt-holes disposed along said length of said elongated substantially solid bar is assured.

* * * * *